United States Patent Office 3,503,473
Patented Mar. 31, 1970

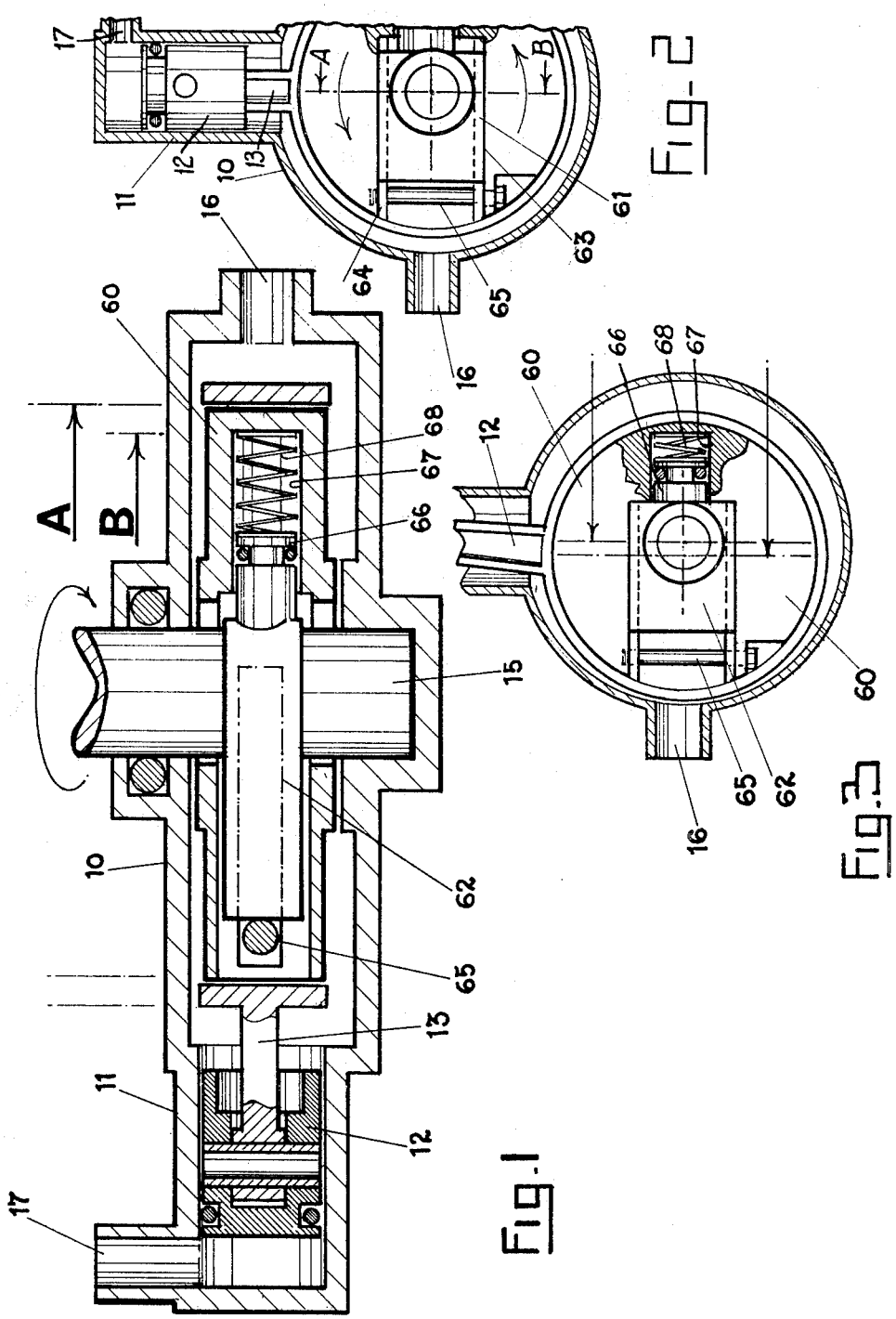

3,503,473
FLUID BRAKING DEVICE
Norman H. Hackett, Bondi, New South Wales, Australia, assignor of fifty percent to Roy J. Cochran, Los Angeles, Calif.
Filed Dec. 14, 1967, Ser. No. 690,603
Claims priority, application Australia, Dec. 16, 1966, 15,432/66
Int. Cl. F16d 57/02
U.S. Cl. 188—91                 3 Claims

ABSTRACT OF THE DISCLOSURE

A braking system for a vehicle wherein each wheel assembly to be provided with braking means is provided with a fluid braking device including a selectively driven reciprocating piston having opposed pumping faces whereby the piston simultaneously, on opposed sides of the piston, intakes fluid and discharges fluid. A fluid conduit means is provided to interconnect the pumping cylinders disposed on the opposed pumping faces of the piston. Fluid control means interposed in the aforementioned fluid conduit means, and actuatable in response to actuation of the vehicle brake pedal, selectively restricts the passage of fluid between the aforementioned opposed cylinders thereby permitting selective retarding or complete arresting of the travel of the pumping piston and accordingly braking the vehicle wheel with which the aforementioned assembly is associated.

---

This invention relates to a braking system for an automobile and particularly such a system wherein the braking effect is hydraulic rather than frictional as in conventional systems.

In the present invention each wheel of a vehicle is adapted to cause a piston to reciprocate which preferably pumps from both its working faces through a braking cylinder assembly and this is connected to a master cylinder which may be of conventional design so that when the latter is operated by a brake pedal the fluid flow from one face of the piston to the other and vice versa is restricted or prevented and this in turn causes the wheel driving the piston to be braked.

The present invention provides a braking system in which a shaft adapted to be rotated by a wheel actuates a piston pumping fluid to and fro through a passageway, formed in a braking cylinder, the braking cylinder having ports in the passageway adapted to be closed by a piston therein and an operating member for displacing said piston thereby braking said shaft.

Speed reducing means may be incorporated on the shaft which reciprocates the piston to limit the speed of displacement of the piston.

The shaft and piston may be arranged to be disconnected from one another so that the piston does not reciprocate when the device is in the off position.

FIGURE 1 is a longitudinal cross sectional view of the wheel brake assembly of the present invention in the on position, FIGURE 2 is an axial cross sectional view of the device of FIGURE 1 in the off position, and FIGURE 3 is an axial cross sectional view similar to that of FIGURE 2 but in the on position.

The invention described in FIGURES 1 and 2 concerns a brake assembly for application to the wheel of a wheeled vehicle in which there is a casing 10 of generally circular cross sectional configuration but with a cylinder 11 extending therefrom. Mounted in the cylinder is a piston 12 which is connected by a connecting rod 13 to an eccentric 60 on an axle 15 so that on rotation of the wheel supporting axle 15 the piston 12 reciprocates in the cylinder 11. The casing 10 and the cylinder 11 in the space behind and ahead of the piston are respectively provided with ports which communicate by means of passageways 16 and 17 to either end of a brake cylinder assembly (not shown).

The eccentric 60 incorporates means for varying the position of the axis of rotation with respect to the shaft 15 which comprises a transverse guideway 61 in which a piston block 62 is housed. The piston block 62 has grooved surfaces 63 which slide on keyways 64. A retaining bolt 65 limits the movement of the piston block in one direction to the centre line position whilst in the other direction it can be displaced by oil pressure entering passageway 16 from a brake cylinder assembly connected thereto as described in FIGURES 1 and 2. The inner end of the piston block has a spigot portion 66 with sealing member which locates in a bore 67 in the eccentric which also houses a return spring 68.

Inasmuch as the total surface area of the "top" of the piston block 62 i.e. that portion adjacent the retaining bolt 65, is greater than the total effective "lower" end of the piston block 62, i.e., that portion adjacent the spigot portion 66, a build-up of oil pressure entering through passageway 16 effects displacement of the piston block 62 from the position shown in FIGURE 2 to the position shown in FIGURE 3.

When the shaft 15 is coaxial with the centre of the eccentric and lines A and B coincide no pumping effect takes place upon movement of the shaft 15. When the centres are not coaxial as in FIGURE 3 and lines A and B do not coincide, the piston 12 is pumping, and braking of the shaft 15 is effected.

The claims defining the invention are as follows.

I claim:

1. A braking system in which a shaft adapted to be rotated by a wheel actuates a piston pumping fluid to and fro through a passageway, formed in a braking cylinder, the braking cylinder having ports in the passageway being closable by a piston therein and an operating member for displacing said piston thereby braking said shaft, said operating member including an eccentric incorporating a slidable block responsive to fluid pressure when the operating member is actuated so that the slidable block having the shaft journaled therein is displaced to vary the throw of the eccentric from a point where the axis of the shaft is coincident with the axis of the eccentric when the brakes are off to a position where such axes are not coincident when the brakes are on.

2. The combination of claim 1 wherein said slidable block comprises a piston block having a top surface and a lower surface, said top surface having a greater total surface area than the effective surface area of said lower surface whereby application of fluid pressure to said piston block effects displacement to vary the throw of the eccentric.

3. The combination of claim 1 including means for normally biasing said slidable block to the position where the axis of the shaft is coincident with the axis of the eccentric.

References Cited

UNITED STATES PATENTS

| 1,630,711 | 5/1927 | McCleary | 188—91 |
| 2,035,387 | 3/1936 | Heritier | 188—91 |
| 2,640,563 | 6/1953 | Sanders | 188—91 |

FOREIGN PATENTS

| 538,514 | 1/1956 | Italy. |

GEORGE E. A. HALVOSA, Primary Examiner